(12) United States Patent
Wang et al.

(10) Patent No.: US 11,132,195 B2
(45) Date of Patent: Sep. 28, 2021

(54) COMPUTING DEVICE AND NEURAL NETWORK PROCESSOR INCORPORATING THE SAME

(71) Applicant: MONTAGE TECHNOLOGY CO., LTD., Shanghai (CN)

(72) Inventors: Peng Wang, Shanghai (CN); Chunyi Li, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 30 days.

(21) Appl. No.: 16/876,133

(22) Filed: May 18, 2020

(65) Prior Publication Data

US 2020/0371785 A1 Nov. 26, 2020

(30) Foreign Application Priority Data

May 24, 2019 (CN) .......................... 201910440000.6

(51) Int. Cl.
  *G06F 9/30* (2018.01)
  *G06F 17/16* (2006.01)
  *G06N 3/063* (2006.01)

(52) U.S. Cl.
  CPC ............ *G06F 9/3001* (2013.01); *G06F 17/16* (2013.01); *G06N 3/063* (2013.01)

(58) Field of Classification Search
  None
  See application file for complete search history.

(56) References Cited

U.S. PATENT DOCUMENTS

| 5,337,395 A * | 8/1994 | Vassiliadis | G06N 3/04 706/42 |
| 10,990,650 B1 * | 4/2021 | Vantrease | G06N 3/08 |
| 2018/0189633 A1 * | 7/2018 | Henry | G06N 3/063 |
| 2018/0189640 A1 * | 7/2018 | Henry | G06F 9/3001 |

OTHER PUBLICATIONS

Lai, L etal., Deep Convolutional Neural Inference with Floating-point Weights and Fixed-point Activations, 2017, Intl. Conf. on Machine Learning, 10 pages. (Year: 2017).*
Hanif, M,A etal., MPNA: a Massively-Parallel Neural Array Accelerator with Data Flow Optimization for Convolutional Neural Networks. Vienna Univ.2018, 8 pages. (Year: 2018).*

(Continued)

*Primary Examiner* — Eric Coleman
(74) *Attorney, Agent, or Firm* — Jun He Law Offices P.C.; James J. Zhu (57) ABSTRACT

The present application discloses a computing device and a neural network processor including the computing device. The computing device includes one or more columns of computing units arranged in an array, wherein at least one computing unit in each column comprises: an arithmetic parameter memory for storing one or more arithmetic parameters; an arithmetic logical unit (ALU) for receiving input data and performing computation on the input data using the one or more arithmetic parameters stored in the arithmetic parameter memory; and an address controller for providing an address control signal to the arithmetic parameter memory to control the storage and output of the one or more arithmetic parameters.

18 Claims, 5 Drawing Sheets

(56) References Cited

OTHER PUBLICATIONS

Marchisio, A, etal., HW/SW Co-Design and Co-Optimization for Deep Learning, 2018, ACM, pp. 13-18. (Year: 2018).*

Lee, S., etal., Double MAC on a DSP: Boosting the Performance of Convolutional Neural Networks on FPGAs, 2018, IEEE., IEEE trans. on Computer aided design of integrated circuits and system, vol. 38, No. 5,, pp. 888-897. (Year: 2018).*

Sharify, S, etal., Loom: Exploiting Weight and Activation Precisions to Accelerate Convolutional Neural Networks, 2018, ACM, 6 pages. (Year: 2018).*

Olsen, E. B., RNS Hardware Matrix Multiplier for High Precision Neural Network Acceleration, 2018 IEEE, 5 pages. (Year: 2018).*

\* cited by examiner

| MAC 00 | |
|---|---|
| Add. | Parameter |
| 0 | filter0_ch0(0) |
| 1 | filter0_ch0(1) |
| ⋮ | ⋮ |
| 8 | filter0_ch0(8) |
| 9 | filter0_chN(0) |
| 10 | filter0_chN(1) |
| ⋮ | ⋮ |
| 17 | filter0_chN(8) |
| 18 | filterM_ch0(0) |
| 19 | filterM_ch0(1) |
| ⋮ | ⋮ |
| 26 | filterM_ch0(8) |
| 27 | filterM_chN(0) |
| 28 | filterM_chN(1) |
| ⋮ | ⋮ |
| 35 | filterM_chN(8) |

| MAC 01 | |
|---|---|
| Add. | Parameter |
| 0 | filter1_ch0(0) |
| 1 | filter1_ch0(1) |
| ⋮ | ⋮ |
| 8 | filter1_ch0(8) |
| 9 | filter1_chN(0) |
| 10 | filter1_chN(1) |
| ⋮ | ⋮ |
| 17 | filter1_chN(8) |
| 18 | filterM+1_ch0(0) |
| 19 | filterM+1_ch0(1) |
| ⋮ | ⋮ |
| 26 | filterM+1_ch0(8) |
| 27 | filterM+1_chN(0) |
| 28 | filterM+1_chN(1) |
| ⋮ | ⋮ |
| 35 | filterM+1_chN(8) |

⋯

| MAC 0(M-1) | |
|---|---|
| Add. | Parameter |
| 0 | filterM-1_ch0(0) |
| 1 | filterM-1_ch0(1) |
| ⋮ | ⋮ |
| 8 | filterM-1_ch0(8) |
| 9 | filterM-1_chN(0) |
| 10 | filterM-1_chN(1) |
| ⋮ | ⋮ |
| 17 | filterM-1_chN(8) |
| 18 | filter2M-1_ch0(0) |
| 19 | filter2M-1_ch0(1) |
| ⋮ | ⋮ |
| 26 | filter2M-1_ch0(8) |
| 27 | filter2M-1_chN(0) |
| 28 | filter2M-1_chN(1) |
| ⋮ | ⋮ |
| 35 | filter2M-1_chN(8) |

| MAC 10 | |
|---|---|
| Add. | Parameter |
| 0 | filter0_ch1(0) |
| 1 | filter0_ch1(1) |
| ⋮ | ⋮ |
| 8 | filter0_ch1(8) |
| 9 | filter0_chN+1(0) |
| 10 | filter0_chN+1(1) |
| ⋮ | ⋮ |
| 17 | filter0_chN+1(8) |
| 18 | filterM_ch1(0) |
| 19 | filterM_ch1(1) |
| ⋮ | ⋮ |
| 26 | filterM_ch1(8) |
| 27 | filterM_chN+1(0) |
| 28 | filterM_chN+1(1) |
| ⋮ | ⋮ |
| 35 | filterM_chN+1(8) |

| MAC 11 | |
|---|---|
| Add. | Parameter |
| 0 | filter1_ch1(0) |
| 1 | filter1_ch1(1) |
| ⋮ | ⋮ |
| 8 | filter1_ch1(8) |
| 9 | filter1_chN+1(0) |
| 10 | filter1_chN+1(1) |
| ⋮ | ⋮ |
| 17 | filter1_chN+1(8) |
| 18 | filterM+1_ch1(0) |
| 19 | filterM+1_ch1(1) |
| ⋮ | ⋮ |
| 26 | filterM+1_ch1(8) |
| 27 | filterM+1_chN+1(0) |
| 28 | filterM+1_chN+1(1) |
| ⋮ | ⋮ |
| 35 | filterM+1_chN+1(8) |

⋯

| MAC 1(M-1) | |
|---|---|
| Add. | Parameter |
| 0 | filterM-1_ch1(0) |
| 1 | filterM-1_ch1(1) |
| ⋮ | ⋮ |
| 8 | filterM-1_ch1(8) |
| 9 | filterM-1_chN+1(0) |
| 10 | filterM-1_chN+1(1) |
| ⋮ | ⋮ |
| 17 | filterM-1_chN+1(8) |
| 18 | filter2M-1_ch1(0) |
| 19 | filter2M-1_ch1(1) |
| ⋮ | ⋮ |
| 26 | filter2M-1_ch1(8) |
| 27 | filter2M-1_chN+1(0) |
| 28 | filter2M-1_chN+1(1) |
| ⋮ | ⋮ |
| 35 | filter2M-1_chN+1(8) |

COMPUTING DEVICE AND NEURAL NETWORK PROCESSOR INCORPORATING THE SAME

CROSS REFERENCE TO RELATED APPLICATIONS

This application is based on and claims priority to Chinese Patent Application No. 201910440000.6 filed on May 24, 2019, the entire content of which is incorporated herein by reference.

FIELD OF THE INVENTION

The present application relates to neural network technology, and more particularly, to a computing device and a neural network processor with distributed arithmetic parameters stored therein.

BACKGROUND

With the development of deep learning and artificial intelligence, neural network technology has been utilized in many fields. Convolutional neural network is a representative artificial neural network, and has been widely used in image processing, speech recognition, natural language processing and other fields.

A convolutional neural network typically uses a neural network processor to perform convolution computations on matrices or tensors. During the computation, the neural network processor needs to read weight parameters stored in a memory external to the processor into the processor for multiply-add computations with other data. However, the weight parameters are generally huge in data size, and the processor can only obtain a part of the weight parameters at a time to participate in the computation. Therefore, the weight parameters need to be repeatedly read from the external memory, which leads to a waste of computation time and a reduction in computation speed.

Therefore, it is necessary to provide an improved computing device and an improved neural network processor.

SUMMARY

An objective of the present application is to provide a computing device and a neural network processor with distributed arithmetic parameters stored therein to reduce the time required to read the arithmetic parameters during a computing operation.

In one aspect, a computing device is provided. The computing device including one or more columns of computing units arranged in an array, wherein at least one computing unit in each column comprises: an arithmetic parameter memory for storing one or more arithmetic parameters; an arithmetic logical unit (ALU) for receiving input data and performing computation on the input data using the one or more arithmetic parameters stored in the arithmetic parameter memory; and an address controller for providing an address control signal to the arithmetic parameter memory to control the storage and output of the one or more arithmetic parameters.

In some embodiments, the one or more arithmetic parameters are weight parameters, and the ALU comprises: a data input port for receiving the input data; a parameter input port for receiving the one or more arithmetic parameters; a transfer input port coupled to a neighboring upstream-stage computing unit in the same column; and a transfer output port coupled to a neighboring downstream-stage computing unit in the same column. The ALU is configured to multiply the input data with the arithmetic parameter to generate a product, and add the product and a transfer parameter received via the transfer input port, and output a sum of the product and the transfer parameter via the transfer output port.

In some embodiments, the arithmetic parameter memory comprises: an input port for receiving the one or more arithmetic parameters; an address control port for receiving the address control signal; and a parameter output port for outputting the one or more arithmetic parameters. The arithmetic parameter memory is configured to store the one or more arithmetic parameters received via the input port under the control of the address control signal, and to output via the parameter output port the one or more arithmetic parameters to the ALU under the control of the address control signal. The address controller is coupled to the address control port of the arithmetic parameter memory to provide the address control signal.

In some embodiments, the address controller further comprises a read enable port and an input enable port, and the address controller is further configured to generate the address control signal in response to a read enable signal received via the read enable port and an input enable signal received via the input enable port.

In some embodiments, the at least one computing unit further comprises: a read enable buffer for buffering a read enable signal transmitted between two neighboring stages of computing units in the same column.

In some embodiments, the one or more columns of computing units arranged in the array comprise at least two columns of computing units, wherein the at least one computing unit further comprises: an output enable buffer for buffering a read enable signal transmitted between neighboring computing units in the same row; and an output data buffer for buffering the input data transmitted between neighboring computing units in the same row.

In some embodiments, the computing device further comprises one or more accumulators each configured to accumulate computing results of the computing units in the same column.

In some embodiments, the computing device further comprises one or more bias units each providing a bias parameter to a column of computing units.

In some embodiments, the computing device further comprises a plurality of data buffers each corresponding to a row of computing units and for providing the input data to the row of computing units.

In some embodiments, the address controller further comprises a read enable port and an input enable port, and the address controller is further configured to generate the address control signal in response to a read enable signal received via the read enable port and an input enable signal received via the input enable port; and wherein the data buffer is coupled to the input enable port and configured to provide the input enable signal to the address controller based on a data storage state in the data buffer.

In some embodiments, the data buffer is a first-in-first-out (FIFO) buffer.

In some embodiments, the computing device further comprises a controller configured to allocate respective arithmetic parameters to the arithmetic parameter memories in the one or more columns of computing units.

In another aspect of the present application, a neural network processor is provided, and the neural network processor comprises the computing device in accordance with the above-mentioned aspects.

In yet another aspect of the present application, a computing method is provided. The method is implemented by one or more columns of computing units arranged in an array, wherein at least one computing unit in each column comprises an arithmetic parameter memory for storing one or more arithmetic parameters and an address controller for controlling storage and output of the one or more arithmetic parameters. For each of the at least one computing unit, the computing method comprises the following steps: receiving input data; acquiring, under the control of the address controller, a corresponding arithmetic parameter from the arithmetic parameter memory of the computing unit, wherein the arithmetic parameter is one of the one or more arithmetic parameters stored in the arithmetic parameter memory under the control of the address controller; and performing computation on the input data using the arithmetic parameter.

The above is an overview of the application, and there may be cases where the details are simplified, generalized, and omitted, so those skilled in the art should realize that this part is only illustrative and is not intended to limit the scope of the application in any way. This summary section is neither intended to determine the key features or essential features of the claimed subject matter nor intended to be used as an auxiliary means to determine the scope of the claimed subject matter.

BRIEF DESCRIPTION OF THE DRAWINGS

The above and other features of the present application will be more clearly understood through the following description and the appended claims, combined with the accompanying drawings. It can be understood that these drawings only depict several embodiments of the content of the present application, and therefore should not be considered as limiting the scope of the content of the present application. By using the accompanying drawings, the content of this application will be more clearly and detailedly explained.

FIG. 6 exemplarily illustrates weight parameters stored in arithmetic parameter memories of some computation units in the computing array shown in FIG. 2.

DETAILED DESCRIPTION OF THE DRAWINGS

In the following detailed description, reference is made to the accompanying drawings, which form a part hereof. In the drawings, similar symbols typically indicate similar components, unless context dictates otherwise. The illustrative embodiments described in the detailed description, drawings, and claims are not intended to be limiting. Other embodiments may be adopted, and other changes may be made, without departing from the spirit or scope of the subject matter of the present application. It can be understood that various aspects of the content of the present application, which are generally described in the present application and illustrated in the drawings, can be configured, replaced, combined, and designed in various different forms, and all of which explicitly constitute a portion of the present application.

In practical applications, a neural network can have multiple layers arranged in certain order to compute inferences, and each layer has a corresponding set of weight parameters, which are constructed as a matrix or a tensor. When performing computations, each layer of the neural network can receive input data and process the input data according to the weight parameters of the layer to generate a computation result. In some embodiments, any layer of the neural network may receive multiple input data and/or generate multiple computation results for output. Optionally, the computation result output by one layer may be fed back to the previous layer as an input. Depending on the specific arrangement of different layers in the neural network, the layers can have different functions (such as input layer, output layer, hidden layer, etc.) and receive different data.

Figure 1:
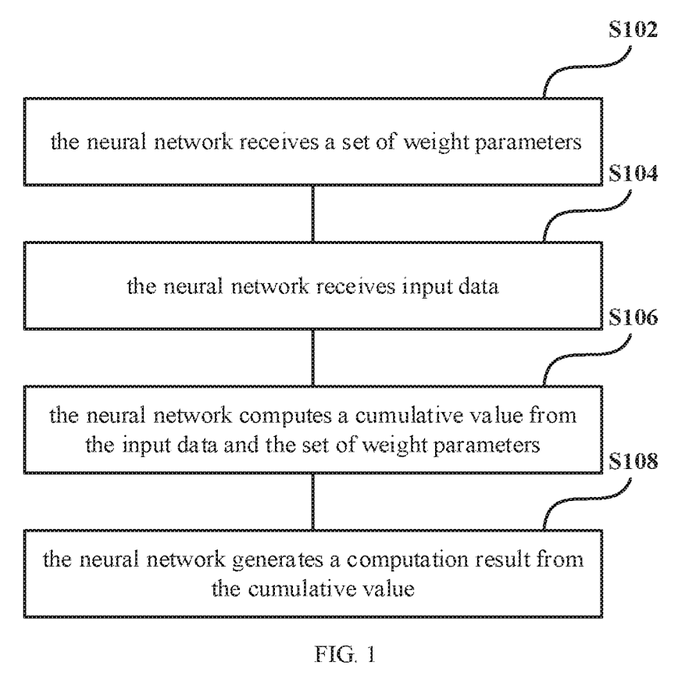
FIG. 1 is a schematic flowchart of a computation process performed by a layer of a neural network according to an embodiment of the present application.

FIG. 1 is a flowchart of a computing process performed by a layer of a neural network according to an embodiment of the present application. In some embodiments, each layer of the neural network may perform this process to compute respective inferences based on the input data it receives. Among them, each layer of the neural network may include a certain number of units (neurons) to perform convolution computation.

In step S102, the neural network receives a set of weight parameters. In some embodiments, the weight parameters are determined, for example, based on a convolution kernel, which may be a two-dimensional matrix of n*m (n and m are natural numbers, and at least one of n and m is greater than 1), or a tensor of a higher dimension, such as a three-dimensional tensor. For example, the size of the convolution kernel can be 3*3*32, where 32 represents the number of channels, and 3*3 represents that each channel is a 3*3 filter matrix. In some embodiments, the filter matrix may be 1*1, and correspondingly, n and m may also be equal to 1, for example, the size of the convolution kernel may be 1*1*32. In some embodiments, the weight parameters may be stored in a main memory of the neural network in advance (for example, a main memory 214 of a neural network processing system 200 shown in FIG. 2), or it may not be stored in advance but may be directly received from outside of the neural network when computing is being performed.

In step S104, the neural network receives input data. In some embodiments, the input data is, for example, a two-dimensional matrix of N*M (N and M are natural numbers, and at least one of N and M is greater than 1). For example, the input data may be image data. The input data can be stored in the main memory in advance or in a data buffer.

In step S106, the neural network computes cumulative value(s) from the input data and the set of weight parameters. When performing matrix convolution computations, the set of weight parameters need to traverse a matrix of the input data, and perform vector computations (dot product) with each sub-matrix of the input matrix during the traversal to obtain the cumulative value(s). For example, for a set of weight parameters, the neural network can multiply each weight parameter with each input data and add the products to obtain the cumulative value.

In step S108, the neural network generates a computation result from the cumulative value(s). The computation result can be stored in a buffer or can be output for subsequent processing.

It should be noted that, in the above-mentioned computation process, the neural network is mainly used to perform matrix or tensor multiplication operations, so it needs to use weight parameters for computation with the input data. In some other data processing and computation methods, the neural network or other computing devices may perform other types of operations on input data (e.g. numerical operations such as summation, or logical operations such as AND operation). Accordingly, these operations may have other types of operation parameters different than weight parameters. In the embodiments of the present application, the weight parameters are exemplarily used as operation parameters for description purpose, but those skilled in the art can understand that the method of the present application can also be used in other operations.

Figure 2:
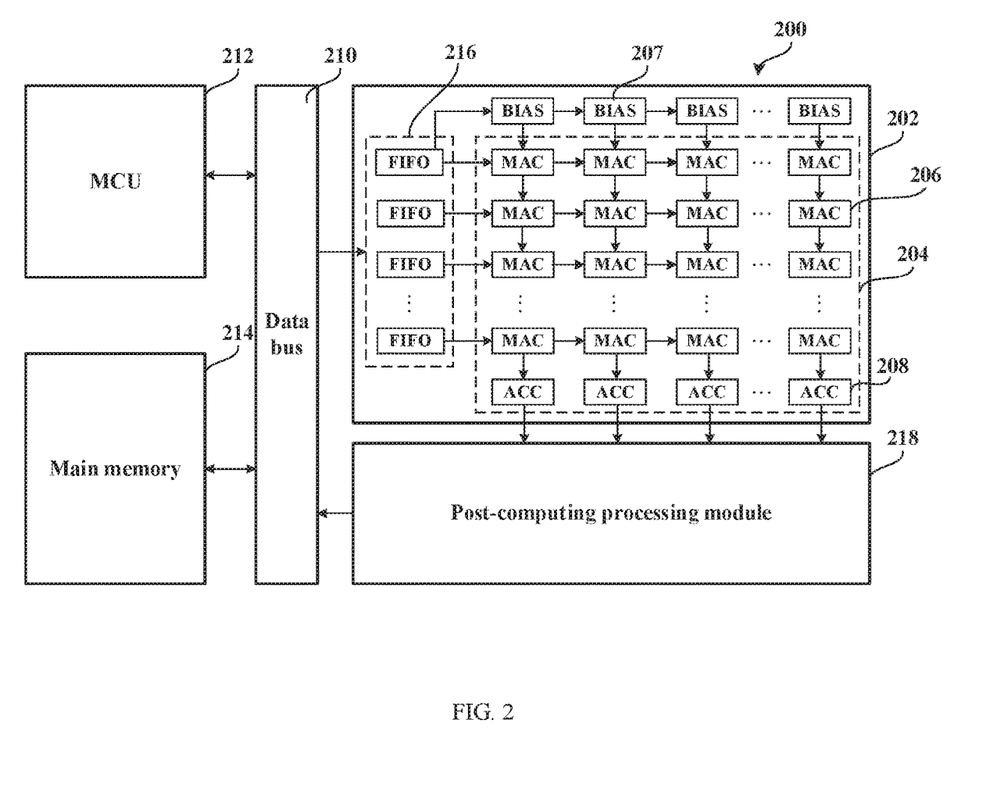
FIG. 2 illustrates a neural network processing system according to an embodiment of the present application.

FIG. 2 illustrates a neural network processing system 200 according to an embodiment of the present application. The neural network processing system 200 can execute, for example, the flowchart shown in FIG. 1.

As shown in FIG. 2, the neural network processing system 200 includes a computing device 202 configured to perform computation of input data and weight parameters. In some embodiments, the computing device 202 includes a computing array 204 configured to include one or more columns of computing units (e.g. Multiply Accumulation, MAC) 206 arranged in an array. Each column of computing units 206 is coupled to each other in series to transmit intermediate computation results. Specifically, the computing units at a preceding stage may pass their intermediate computation results to the respective computing units at a stage after the preceding stage as their transfer inputs. In some embodiments, a first-stage computing unit of each column of computing units may be coupled to a bias unit (BIAS) 207. The bias unit 207 can provide a bias value to a transfer input of the first-stage computing unit to which it is coupled. The specific structure of the bias unit 207 will be described in detail below. In other embodiments, the transfer input of the first-stage computing unit of each column of computing units may also be directly set to zero.

A last-stage computing unit of each column of computing units may be coupled to an accumulator 208 for accumulating the computation results of the column of computing units. In some embodiments, particularly when the number of columns of the weight matrix (convolution kernel) of the weight parameters exceeds the number of columns of the computing array 204, or when the number of rows of the input matrix exceeds the number of rows of the computing array 204, the accumulator 208 may store and accumulate the results of respective columns. In some embodiments, when the number of columns of the weight matrix is less than or equal to the number of columns of the computing array 204, or when the number of rows of the input matrix is less than or equal to the number of rows of the calculation array 204, the accumulator 208 may not perform accumulation. The computation result of each column of computing units can be provided to a vector computing unit (not shown), which can process the computation results of multiple columns and output the processed computation results in a vector form, for example, output to and stored in the main memory.

In some embodiments, the computing array 204 includes multiple columns of computing units, where each column of computing units may utilize different weight parameters for computation. Accordingly, a computing unit in each column of computing units is coupled as a row with corresponding computing units in the other columns of computing units. In such a row of computing units, each computing unit can pass its input data to a neighboring next-stage computing unit, so that each column of computing units can perform vector calculations on the corresponding weight parameters and input data in order. In one example, the computing array 204 may include 6 columns of computing units, where each column of computing units corresponds to a filter matrix (which may be a channel of a convolution kernel) having a corresponding set of weight parameters. Correspondingly, an input matrix of input data can be convolved with the six filter matrices at most, without the need to repeatedly provide the input data to each column of computing units. If the input matrix needs to be convolved with 12 filter matrices, the input data needs to be provided repeatedly to each column of computing units, and each column of computing units needs to read the weight parameters twice (corresponding to 2 filter matrices) for computation.

In some embodiments, the computing device 202 is coupled to a microcontroller 212 and the main memory 214 through a data bus 210. The microcontroller 212 controls the operation of the entire neural network processing system 200, and instructs to read the weight parameters from the main memory 214 and pass the weight parameters to the computing device 202 via the data bus 210. Different from the existing neural network processor, the computing units 206 in the computing device 202 may be provided with respective arithmetic parameter memories (not shown). In some embodiments, each computing unit 206 includes an arithmetic parameter memory. The weight parameters read from the main memory 214 may be stored in advance in the corresponding arithmetic parameter memories before the input data is provided to the computing device 202. In other words, the microcontroller 212 can control the allocation of respective weight parameters to each arithmetic parameter memory in one or more columns of computing units. In some embodiments, the microcontroller 212 may also be another type of controller, such as a hardware state machine. After the weight parameters required for computation are correctly written into the arithmetic parameter memories, the microcontroller 212 further instructs to read the input data from the main memory 214 and transfer the input data to the computing device 202 through the data bus 210. In some embodiments, the computing device 202 may have multiple data buffers 216, where each data buffer 216 corresponds to a row of computing units for buffering input data provided by the main memory 214, and for further providing the input data to the row of computing units. In some embodiments, the data buffer 216 may be a first-in-first-out (FIFO) buffer.

In some embodiments, after detecting the input data in the data buffer 216, the computing array 204 starts the computing units 206 to perform computations in sequence. As mentioned above, multiple computation results are passed down in the column direction (to respective downstream-stages), and finally accumulated at the accumulators 208 to form convolution results. In some embodiments, the neural network processing system 200 may further include a post-computing processing module 218 coupled between the computing device 202 and the data bus 210, for one or more post-computing processing of the convolution results generated by the computing device 202, such as batch normalization, addition, activation, pooling, and padding. After the post-computing processing, the post-computing processing module 218 may output the processing result through the data bus 210 or further write it back to the data buffer 216 as the input data of the next layer of the neural network.

In some embodiments, the computing device shown in FIG. 2 may be used for a neural network processor.

It can be seen that, for the neural network processing system 200 shown in FIG. 2, since the arithmetic parameter memories are set in the computing units 206 to store respective weight parameters provided by the main memory in advance, the computing unit 202 does not need to obtain from the main memory 214 the weight parameters for multiple times during the actual convolution computation, which enables the data bus to be mainly used to transmit input data, thereby reducing delay. In addition, in the computation process, the weight parameters are distributedly stored in the arithmetic parameter memories inside the computing units, which is conducive to the uniform distribution of chip power consumption to a certain extent, is conducive to chip heat dissipation, thereby supporting higher chip operation frequency.

Figure 3:
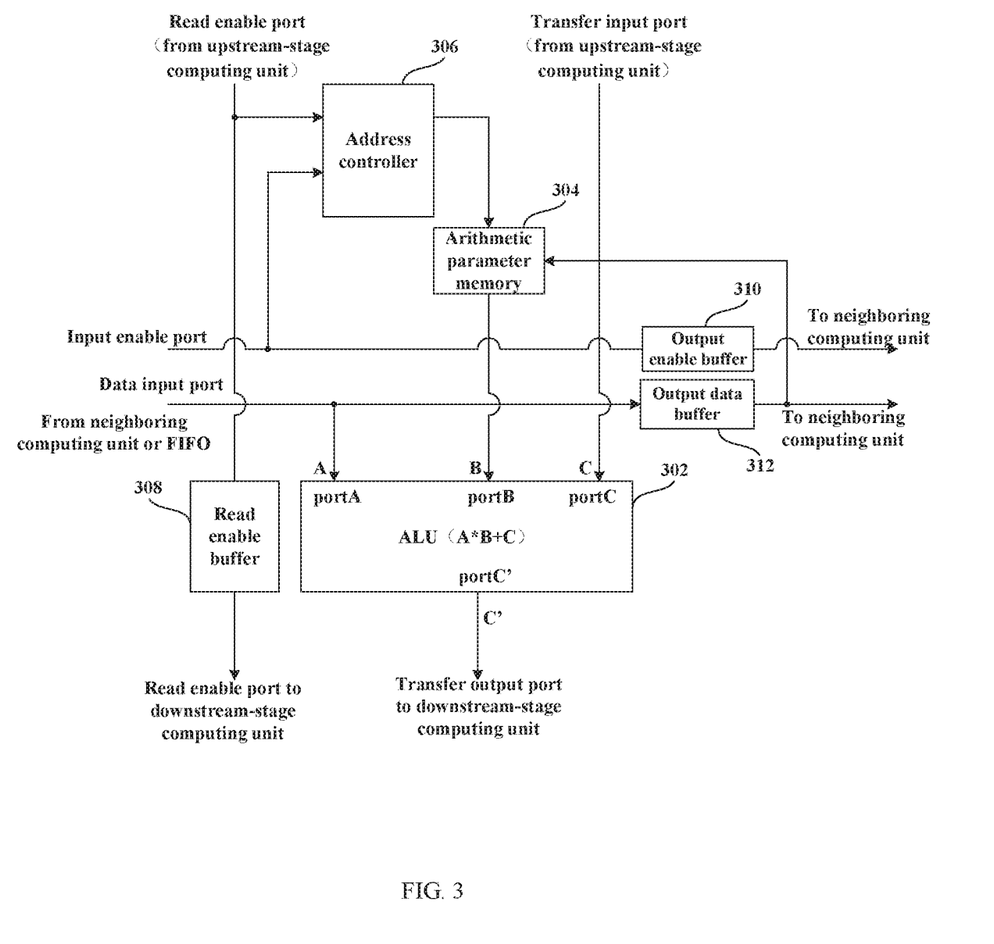
FIG. 3 illustrates an exemplary structure of a computing unit in the neural network processing system of FIG. 2.

FIG. 3 illustrates an exemplary structure of a computing unit in the neural network processing system of FIG. 2.

As shown in FIG. 3, the computing unit includes an arithmetic logic unit 302, which includes a data input port portA for inputting data A, a parameter input port portB for inputting weight parameters B, a transfer input port portC coupled to a neighboring upstream-stage computing unit in the same column and a transfer output port portC' coupled to a neighboring downstream-stage computing unit (MAC) in the same column. The arithmetic logic unit 302 performs operation on the input data using the weight parameters, specifically, for example, multiplies the input data A received via the data input port portA with the weight parameters B received via the parameter input port portB, and adds the multiplication operation result A*B and a transfer parameter C input via the transfer input port portC. Thereafter, the arithmetic logic unit 302 may output the addition operation result C' via the transfer output port portC. In other words, the arithmetic logic unit 302 performs the operation defined by the following equation (1):

$$C'=A*B+C \qquad (1)$$

Wherein the parameters A, B, C and C' in equation (1) are all vectors.

For a row of computing units, the data input port portA of the most upstream-stage computing unit is coupled to the data buffer to receive input data buffered by the data buffer; for other computing units in the row of computing units, their data input ports are coupled to respective neighboring upstream-stage computing units to receive respective input data. For a column of computing units, the transfer input port portC of the most upstream-stage computing unit is coupled to the bias unit to receive a bias value; for other computing units in the column of computing units, their transfer input ports portC are coupled to the transfer output ports portC' of their respective upstream-stage computing units.

In some embodiments, the computing unit may further include an output enable buffer 310 coupled between the input enable ports of neighboring computing units in the same row and used to buffer an input enable signal transmitted between the neighboring computing units in the same row. Similarly, the computing unit further includes an output data buffer 312 coupled between the data input ports of neighboring computing units in the same row and used to buffer input data transmitted between the neighboring computing units in the same row. The output enable buffer 310 and the output data buffer 312 can be controlled by preset clock control signal(s), so that the computing units in different columns perform operations according to a required timing. In some embodiments, both the output enable buffer 310 and the output data buffer 312 may be registers.

The computing unit also includes an arithmetic parameter memory 304 and an address controller 306. Under the control of the address control signal generated by the address controller 306, the arithmetic parameter memory 304 receives and stores one or more weight parameters, and outputs the weight parameters stored therein to the arithmetic logic unit 302.

Specifically, the arithmetic parameter memory 304 has an input port for inputting weight parameters, an address control port for inputting an address control signal, and a parameter output port for outputting weight parameters. The address control port is coupled to the address controller 306, and the parameter output port is coupled to the parameter input port of the arithmetic logic unit 302. In the exemplary structure shown in FIG. 3, the input port of the arithmetic parameter memory 304 is coupled to the data input port through the output data buffer 312, so that the weight parameters are input through the data input port. As described above in conjunction with the embodiment shown in FIG. 2, since the weight parameters are stored in the arithmetic parameter memory 304 before data is input from the data input port, the data input port is time-multiplexed to receive the input data and the weight parameters, which can effectively reduce the number of signal lines, thereby reducing manufacturing cost. It can be understood that, in some other embodiments, the input port of the arithmetic parameter memory 304 may also be coupled to the data buffer or the neighboring upstream-stage computing unit through a separate signal line to receive the weight parameters provided by the main memory via them.

The address controller 306 is coupled to the address control port of the arithmetic parameter memory 304, and provides an address control signal to the arithmetic parameter memory 304 to control the storage and output of weight parameters. In some embodiments, when the weight parameters are written into the arithmetic parameter memory 304, the address controller 306 may generate an address control signal for controlling the writing of the weight parameters, where the address control signal includes storage addresses corresponding to the weight parameters that indicate the storage locations of the weight parameters in the arithmetic parameter memory. On the other hand, when the weight parameters are read from the arithmetic parameter memory 304, the address controller 306 may generate an address control signal that controls the output of the weight parameters, where the address control signal includes the storage addresses the same as those used during the writing operation, so that the arithmetic parameter memory 304 may output weight parameters according to the storage addresses. It can be understood that the main controller may write a plurality of weight parameters into the arithmetic parameter memory 304 before computing, and each weight parameter may have a corresponding storage address. For example, a plurality of weight parameters may be sequentially stored in the arithmetic parameter memory 304. In some embodiments, each arithmetic parameter memory may store a plurality of weight parameters it receives continuously or at intervals. In other embodiments, a plurality of weight parameters may be stored in the arithmetic parameter memory together with the corresponding identifiers, for example, in the form of a look-up table. In this way, when the computing unit performs computation, it can search for the required weight parameters by querying the corresponding identifiers.

It can be understood that the computing units at different positions in the computing array may be assigned with different weight parameters to perform computation with the input matrix of the input data according to the computation rule of the matrix or tensor. FIG. 6 exemplarily illustrates weight parameters stored in arithmetic parameter memories of some computing units in the computing array shown in FIG. 2. However, it should be noted that the storage of the weight parameters shown in FIG. 6 is only exemplary, and the weight parameters may be stored in different ways according to different applications.

As shown in FIG. 6, assuming that the computing array has a total of N rows and M columns of computing units (from computing unit MAC00 to MAC (N−1)(M−1) (not shown)), and the weight parameters may be elements that consist a convolution kernel. In addition, assuming that there are 2M convolution kernels (filter 0 to filter (2M−1)) involved in the arithmetic operation, each convolution kernel is a tensor dimensioned 3*3*2N, where 2N represents the number of channels of the convolution kernel. In order for computation with the corresponding input data (such as image data), the elements included in these convolution kernels are the weight parameters.

Specifically, since the number 2M of convolution kernels is twice the number of columns M of the computing array, each computing unit stores weight parameters of two convolution kernels. For example, the computing unit MAC00 stores a part of the weight parameters of the convolution kernel 0 and the convolution kernel M, while the computing unit MAC01 stores a part of the weight parameters of the convolution kernel 1 and the convolution kernel M+1, and so on, and the computing unit MAC0(M−1) stores a part of the weight parameters of convolution kernel M−1 and convolution kernel 2M−1. The computing unit MAC (N−1)(M−1) stores a part of the weight parameters of the convolution kernel M−1 and the convolution kernel 2M−1.

Each convolution kernel has 2N 3*3 matrices in total, so that each computing unit stores two 3*3 matrices of a convolution kernel. Thus, the 2N 3*3 matrices in each convolution kernel are assigned to N computing units in a column of computing units in sequence. Specifically, for a convolution kernel filter 0, a 3*3 matrix (9 elements) of its channel 0 and a 3*3 matrix of its channel N are sequentially stored in the arithmetic parameter memory addresses 0-8 of the computing unit MAC00; a 3*3 matrix of its channel 1 and a 3*3 matrix of its channel N+1 are sequentially stored in the arithmetic parameter memory addresses 0-8 of the computing unit MAC10; and so on, and a 3*3 matrix of its channel N−1 and a 3*3 matrix of its channel 2N−1 are sequentially stored in the arithmetic parameter memory addresses 0-8 of the computing unit MAC (N−1)0.

When performing matrix operations, the address controller of each computing unit may obtain one weight parameter from an arithmetic parameter memory coupled to thereto according to the timing and multiply it with the corresponding input data. After multiple operation cycles, each weight parameter in the arithmetic parameter memory can be recalled as needed to achieve the corresponding operation. Therefore, it can be realized that the convolution kernel be convoluted with the input matrix.

In some embodiments, the address controller 306 further includes a read enable port and an input enable port, wherein the read enable port is coupled to the read enable buffer 308 of an upstream-stage computing unit in the same column, and the input enable port is coupled to the data buffer or a neighboring computing unit in the same row. In this way, the address controller 306 can generate an address control signal in response to the read enable signal received via the read enable port and the input enable signal received via the input enable port. The read enable buffer 308 may be a register.

Specifically, the input enable signal is transmitted synchronously with the input data provided via the data input port, and together with the read enable signal, indicating the storage/writing or output of the weight parameter. For example, when the input enable signal is valid, the corresponding weight parameter or input data is transmitted via the data input port. At this time, if the read enable signal indicates that the weight parameter is to be written in the arithmetic parameter memory 306, the address controller 306 may generate an address control signal that controls the storage of the weight parameter in response to these two signals; however, if the read enable signal instructs the arithmetic parameter memory 306 to provide the weight parameter stored therein to the arithmetic logic unit 302, the address controller 306 may generate an address control signal that controls the output of the weight parameter in response to these two signals. On the other hand, if the input enable signal is invalid, the address controller 306 may not operate.

In some embodiments, the data buffer may provide the input enable signal to the address controller according to the data storage state therein. For example, when data (input data or weight parameter) has been buffered in the data buffer, the data buffer can provide a valid input enable signal to the address controller, otherwise it can provide an invalid input enable signal.

In some embodiments, the computing unit further includes a read enable buffer 308, which is used to buffer the read enable signal transmitted between two neighboring computing units in the same column. By setting the clock control signal of the read enable buffer 308, the read enable signal can be sequentially transmitted between the computing units in the same column, so that these computing units can sequentially receive and output weight parameters.

Figure 4:
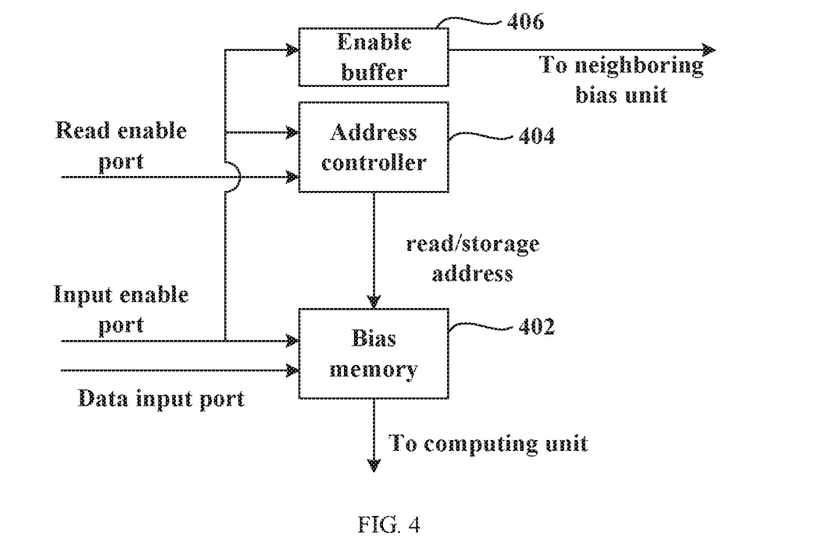
FIG. 4 illustrates an exemplary structure of a bias unit in the neural network processing system of FIG. 2.

FIG. 4 illustrates an exemplary structure of a bias unit in the neural network processing system of FIG. 2.

As shown in FIG. 4, the bias unit includes a bias memory 402 configured to store bias parameter(s), such as 0 or other values. The bias parameters may be written into the bias memory 402 in advance, for example, via its data input port. The write control of the bias parameter can refer to the write control of the weight parameter shown in FIG. 3. In the process of the convolution computation performed by the computing device shown in FIG. 2, the bias parameter can be output to the computing unit coupled to the bias unit, i.e. the transfer input of the most upstream-stage computing unit in the same column of computing units, such that the transfer input C of the computing unit shown in FIG. 3 can be set as the bias parameter.

The bias unit further includes an address controller 404, which has a read enable port and an input enable port. Similar to the computing unit shown in FIG. 3, the read enable port can be used to receive the read enable signal, and the input enable port can be used to receive the input enable signal. Based on the received read enable signal and input enable signal, the address controller 404 may generate a control signal for controlling whether the bias parameter is output or not, and further which bias parameter is output. In some embodiments, the address controller 404 may be configured as a counter, which may sequentially store the bias parameters and sequentially output the bias parameters. It can be understood that, when used for convolution computation, the bias parameters only need to be provided once for each convolution computation.

The bias unit also includes an enable buffer 406, which is coupled between adjacent bias units to buffer the input enable signal transmitted between the adjacent computing units. For more details of the read enable signal and the input enable signal, the related description in conjunction with the embodiment shown in FIG. 3 can be referred to with more details.

Figure 5:
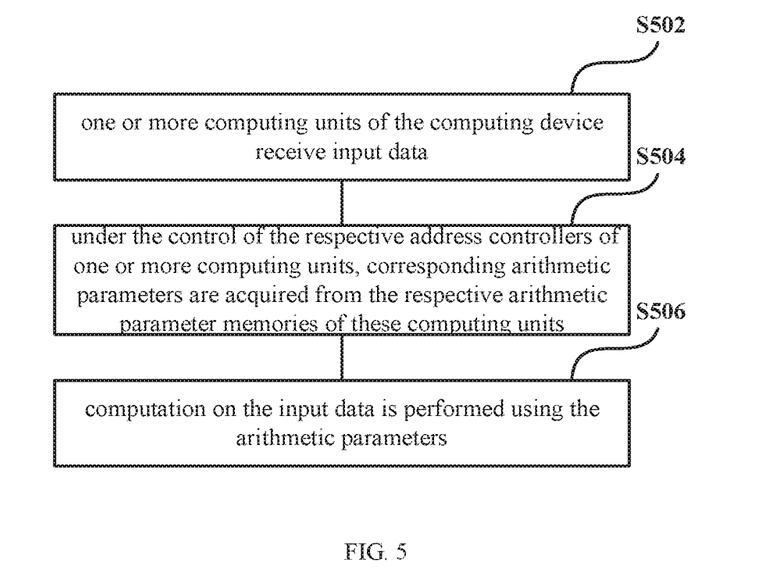
FIG. 5 illustrates a computing method according to an embodiment of the present application.

FIG. 5 illustrates a computing method according to an embodiment of the present application. The computing method may be implemented by the computing device shown in FIGS. 2 to 4 to perform, for example, a matrix convolution computation.

As shown in FIG. 5, in step S502, one or more computing units of the computing device receive input data. The input data is, for example, one or more pixel values in a column of pixels in an image data. In other words, the entire input data received by the computing device is constructed as a matrix.

In step S504, under the control of the respective address controllers of one or more computing units, corresponding arithmetic parameters are acquired from the respective arithmetic parameter memories of these computing units. Each computing unit can acquire one arithmetic parameter, and this arithmetic parameter is one of one or more arithmetic parameters stored in the arithmetic parameter memory. These arithmetic parameters may be stored in the arithmetic parameter memory in advance under the control of the address controller. According to different matrices, each computing unit can be assigned a corresponding arithmetic parameter and stored in its arithmetic parameter memory.

In step S506, computation on the input data is performed using the arithmetic parameters. In some embodiments, the computation performed by the computing device is a matrix convolution computation, and the arithmetic parameter may be a weight parameter. Correspondingly, for each computing unit, it also needs to receive the transfer parameter from a neighboring upstream-stage computing unit in the same column, and multiply the input data and the weight parameter, and add the arithmetic result of the product and the transfer parameter. The addition result obtained in this way can be used as the input to the downstream-stage computing unit of the same column as its transfer parameter.

It can be understood that the computing device and the computing method of the embodiments of the present application may be applied to neural network processors, and such neural network processors may also be used in different computer systems.

It should be noted that although several modules or sub-modules of the computing device are mentioned in the above detailed description, this division is merely exemplary and not mandatory. In fact, according to the embodiments of the present application, the features and functions of the two or more modules described above may be embodied in one module. Conversely, the features and functions of a module described above can be further divided into multiple modules to be embodied.

In addition, although the operations of the computing method of the present application are described in a specific order in the drawings, this does not require or imply that the operations must be performed in the specific order, or all the operations shown must be performed to achieve the desired result. Instead, the steps depicted in the flowchart can change the order of execution. Additionally or alternatively, some steps may be omitted, multiple steps may be combined into one step for execution, and/or one step may be decomposed into multiple steps for execution. Those of ordinary skill in the art can understand and implement other changes to the disclosed embodiments by studying the description, the disclosure, the drawings, and the appended claims. In the claims, the word "comprising" does not exclude other elements and steps, and the words "a" and "an" do not exclude plurals. In the actual application of this application, one part may perform the functions of multiple technical features cited in the claims. Any reference signs in the claims should not be construed as limiting the scope.

What is claimed is:

1. A computing device including one or more columns of computing units arranged in an array, wherein at least one computing unit in each column comprises:
    an arithmetic parameter memory for storing one or more arithmetic parameters;
    an arithmetic logical unit (ALU) for receiving input data and performing computation on the input data using the one or more arithmetic parameters stored in the arithmetic parameter memory; and
    an address controller for providing an address control signal to the arithmetic parameter memory to control the storage and output of the one or more arithmetic parameters.

2. The computing device of claim 1, wherein the one or more arithmetic parameters are weight parameters, and the ALU comprises:
    a data input port for receiving the input data;
    a parameter input port for receiving the one or more arithmetic parameters;
    a transfer input port coupled to a neighboring upstream-stage computing unit in the same column; and
    a transfer output port coupled to a neighboring downstream-stage computing unit in the same column;
    wherein the ALU is configured to multiply the input data with the arithmetic parameter to generate a product, and add the product and a transfer parameter received via the transfer input port, and output a sum of the product and the transfer parameter via the transfer output port.

3. The computing device of claim 2, wherein the arithmetic parameter memory comprises:
    an input port for receiving the one or more arithmetic parameters;
    an address control port for receiving the address control signal; and
    a parameter output port for outputting the one or more arithmetic parameters;
    wherein the arithmetic parameter memory is configured to store the one or more arithmetic parameters received via the input port under the control of the address control signal, and to output via the parameter output port the one or more arithmetic parameters to the ALU under the control of the address control signal; and
    wherein the address controller is coupled to the address control port of the arithmetic parameter memory to provide the address control signal.

4. The computing device of claim 3, wherein the address controller further comprises a read enable port and an input enable port, and the address controller is further configured to generate the address control signal in response to a read enable signal received via the read enable port and an input enable signal received via the input enable port.

5. The computing device of claim 2, wherein the at least one computing unit further comprises:
    a read enable buffer for buffering a read enable signal transmitted between two neighboring stages of computing units in the same column.

6. The computing device of claim 2, wherein the one or more columns of computing units arranged in the array comprise at least two columns of computing units, wherein the at least one computing unit further comprises:

an output enable buffer for buffering a read enable signal transmitted between neighboring computing units in the same row; and an output data buffer for buffering the input data transmitted between neighboring computing units in the same row.

7. The computing device of claim 2, further comprising one or more accumulators each configured to accumulate computing results of the computing units in the same column.

8. The computing device of claim 2, further comprising one or more bias units each providing a bias parameter to a column of computing units.

9. The computing device of claim 1, further comprising a plurality of data buffers each corresponding to a row of computing units and for providing the input data to the row of computing units.

10. The computing device of claim 9, wherein the address controller further comprises a read enable port and an input enable port, and the address controller is further configured to generate the address control signal in response to a read enable signal received via the read enable port and an input enable signal received via the input enable port; and wherein the data buffer is coupled to the input enable port and configured to provide the input enable signal to the address controller based on a data storage state in the data buffer.

11. The computing device of claim 9, wherein the data buffer is a first-in-first-out (FIFO) buffer.

12. The computing device of claim 1, further comprising a controller configured to allocate respective arithmetic parameters to the arithmetic parameter memories in the one or more columns of computing units.

13. A neural network processor comprising the computing device according to claim 1.

14. A computing method implemented by one or more columns of computing units arranged in an array, wherein at least one computing unit in each column comprises an arithmetic parameter memory for storing one or more arithmetic parameters and an address controller for controlling storage and output of the one or more arithmetic parameters; for each of the at least one computing unit, the computing method comprises the following steps:

receiving input data;

acquiring, under the control of the address controller, a corresponding arithmetic parameter from the arithmetic parameter memory of the computing unit, wherein the arithmetic parameter is one of the one or more arithmetic parameters stored in the arithmetic parameter memory under the control of the address controller; and performing computation on the input data using the arithmetic parameter.

15. The computing method of claim 14, wherein the one or more arithmetic parameters are weight parameters, and the method further comprises the following steps:

receiving a transfer parameter output by a neighboring upstream-stage computing unit in a same column;

wherein the step of performing computation on the input data using the arithmetic parameter comprises: multiplying, by the computing unit, the input data with the weight parameter to generate a product, and adding the product and the transfer parameter.

16. The computing method of claim 14, wherein the one or more columns of computing units arranged in the array comprise at least two columns of computing units, wherein the method further comprises the following step:

buffering the input data to provide the input data to a corresponding computing unit in a neighboring column of computing units.

17. The computing method of claim 14, wherein before the step of acquiring the arithmetic parameter, the computing method further comprises the following step:

allocating respective arithmetic parameters to the arithmetic parameter memories in the one or more columns of computing units.

18. The computing method of claim 14, wherein the computing method is used for matrix convolution computation.

* * * * *